United States Patent [19]

Ebinuma et al.

[11] Patent Number: 5,120,521
[45] Date of Patent: Jun. 9, 1992

[54] METHOD OF PRODUCING COLORED PRECIPITATED CALCIUM CARBONATE

[75] Inventors: Osamu Ebinuma; Takashi Sakaguchi; Akira Yokoi; Yoshiki Saitoh, all of Kasugai, Japan

[73] Assignee: Oji Paper Co., Ltd., Tokyo, Japan

[21] Appl. No.: 637,833

[22] Filed: Jan. 7, 1991

[51] Int. Cl.$^5$ .............................................. C01F 11/18
[52] U.S. Cl. .................................. 423/432; 106/465; 423/165
[58] Field of Search ............... 423/432, 165; 106/464, 106/465

[56] References Cited

U.S. PATENT DOCUMENTS

| | | | |
|---|---|---|---|
| 3,347,625 | 10/1967 | Taylor | 106/465 |
| 4,018,877 | 4/1977 | Woode | 423/432 |
| 4,559,214 | 12/1985 | Howard et al. | 423/432 |
| 4,661,164 | 4/1987 | Severinghaus | 106/465 |

FOREIGN PATENT DOCUMENTS

| | | | |
|---|---|---|---|
| 54-149399 | 11/1979 | Japan | 423/432 |
| 63-67184 | 3/1988 | Japan | 423/432 |
| 14813 | 1/1990 | Japan | 423/432 |

Primary Examiner—John Niebling
Assistant Examiner—Brian M. Bolam
Attorney, Agent, or Firm—Armstrong, Nikaido, Marmelstein, Kubovcik & Murray

[57] ABSTRACT

A colored precipitated calcium carbonate having a strong color fastness in water is produced by preparing an aqueous slurry containing calcium hydroxide and a water-soluble dye, for example, a direct dye, introducing a carbon dioxide-containing gas into the aqueous slurry, and collecting the resultant colored precipitated calcium carbonate from the aqueous slurry at a pH of 8.2 or more thereof.

7 Claims, No Drawings

METHOD OF PRODUCING COLORED PRECIPITATED CALCIUM CARBONATE

BACKGROUND OF THE INVENTION

1) Field of the Invention

The present invention relates to a method of producing a colored, precipitated calcium carbonate.

More particularly, the present invention relates to a method of producing a colored precipitated calcium carbonate containing a water-soluble dye firmly fixed to the precipitated calcium carbonate, and useful as a filler for producing a colored paper sheet having a strong color fastness without generating a difference in the hue and color depth of the front and back surfaces thereof.

2) Description of the Related Arts

In the production of paper sheets, for example, printing paper sheets, a pulp slurry is mixed with a relatively inexpensive filler, to impart various properties, for example, a desired surface smoothness, opacity and whiteness, and to lower the production cost of the paper sheets.

In a conventional acid paper-forming method, the filler comprises clay, talc or titanium dioxide. Most of these filler materials are imported, and thus are difficult to obtain and are expensive.

A recent increase in the demand for paper sheets having a high storage stability and durability has drawn attention to a neutral paper-forming method in which a paper sheet is formed at a neutral pH range. In this neutral paper forming method, a cheap natural limestone, which can be easily obtained from domestic sources, is used as a filler, i.e., a wet or dry pulverizing product of limestone is widely used as a ground calcium carbonate filler.

Also, precipitated calcium carbonate, which is produced by reacting an acid gas such as carbon dioxide gas with calcium hydroxide, is advantageous in that the whiteness and opacity thereof are higher, and the wire abrasion of a paper machine therewith is less than those of the ground calcium carbonate, and thus is now widely employed.

In view of an increased ease of reading, various colored paper sheets are utilized as printing paper sheets for books, in addition to white paper sheets.

In the conventional production of colored paper sheets, the pulp slurry is mixed with a filler and a dye. Usually, the dye usable for producing the colored paper sheets has a high dyeing effect on the pulp fibers, but the dyeing effect of the dye on the filler such as the light (precipitated) calcium carbonate is usually poor.

In a process for forming a paper sheet from a pulp slurry containing an additive, for example, a filler and dye, by using a single wire paper machine, a resultant wet paper layer formed on a wire net is forcibly dehydrated through the wire net while allowing portions of the additive and fine pulp fibers to flow out through the wire net, and therefore, the distribution of the additive in the wet paper layer changes along the Z direction of the paper layer (at a right angle to the wet paper layer surface). Namely, usually the amount of the additive distributed on the front surface portion of the paper layer is larger than that on the back surface portion thereof.

Therefore, when the pulp slurry contains a non-colored filler and a dye, although the dye is uniformly absorbed by the pulp fibers during the paper-forming process, if the non-colored filler is unevenly distributed in the colored pulp paper layer, as mentioned above, a difference in the color of the resultant paper sheet occurs at the front and back surfaces thereof.

If the filler is made the same color as the colored pulp fibers, even if the colored filler is unevenly distributed, no difference appears in the color of the front and back surfaces of the resultant paper sheet.

The precipitated calcium carbonate, however, has a poor affinity to the dye, and thus, even when dyed with the dye, when the dyed precipitated calcium carbonate particles are brought into contact with pulp fibers, the dye on the precipitated calcium carbonate particles is moved therefrom to the pulp fibers and the dyed precipitated calcium carbonate particles are decolored, and thus, a color difference appears between the front and back surfaces of the resultant colored paper sheet.

Various attempts have been made to eliminate the above-mentioned color difference between the front and back surfaces of the colored paper sheet.

For example, Japanese Examined Patent Publication No. 61-70099 discloses a method of producing a colored paper sheet, in which method a pigment and a dye having the same color as each other are concurrently employed. This method, however, is disadvantageous in that the pigment is expensive in comparison with the dye, and thus the cost of the resultant colored paper sheet is undesirably raised. Also, this method causes the content of the pigment, which is a water-insoluble substance in the pulp slurry, to be increased, and thus the inside of the paper-forming machine is stained by the water-insoluble substance. Further, this method is disadvantageous in that an additional device for supplying the pigment to the pulp slurry must be added to the paper-forming machine, and thus the paper-forming operation becomes complicated. Furthermore, when an organic or inorganic pigment containing a heavy metal is employed, there is a risk of environmental pollution by the heavy metal, and thus the use of the pigment is not permissible.

In another method, a pulp slurry is mixed with a filler and a dye, to concurrently color the pulp fibers and the filler with the dye, and the resultant dye-containing pulp and filler slurry is used to produce a colored paper sheet.

In still another method, a filler is first dyed with a water-soluble dye, and then a pulp slurry mixed with the colored filler is subjected to the paper-forming procedure.

Nevertheless, the colored calcium carbonate produced by the conventional method has a poor color fastness, and thus the above-mentioned conventional methods are not successful in practice.

Accordingly, there is a great demand for the provision of a colored precipitated calcium carbonate having a strong color fastness.

SUMMARY OF THE INVENTION

An object of the present invention is to provide a method of producing a colored, precipitated calcium carbonate having a strong color fastness.

Another object of the present invention is to provide a method of producing a colored, precipitated calcium carbonate useful for producing a uniformly colored paper sheet without a decoloration of the colored, precipitated calcium carbonate during the paper-forming procedure, and without generating a color difference between front and back surfaces thereof.

The above-mentioned objects can be attained by the method according to the present invention of producing a colored, precipitated calcium carbonate, comprising:

mixing calcium hydroxide with a water-soluble dye in water to prepare a colored aqueous slurry thereof;

introducing a gas-containing carbon dioxide into the colored aqueous slurry to convert the calcium hydroxide to a colored calcium carbonate while allowing the resultant colored calcium carbonate to precipitate; and collecting the resultant colored precipitated calcium carbonate from the aqueous slurry at a pH of 8.2 or more of the aqueous slurry.

In an embodiment of the above-mentioned method of the present invention, the pH of the colored aqueous slurry is preferably controlled to a level of 8.5 or more at at least a stage at which the conversion of the calcium hydroxide to the colored calcium carbonate is completed.

In another embodiment of the above-mentioned method of the present invention, preferably after the precipitation of the colored calcium carbonate is completed, the aqueous slurry containing the colored precipitated calcium carbonate is supplemented with an additional amount of calcium hydroxide, to adjust the pH of the resultant aqueous slurry to a level of 9.5 or more.

DESCRIPTION OF THE PREFERRED EMBODIMENTS

In the method of the present invention, it is essential that a gas-containing carbon dioxide is introduced into an aqueous slurry containing calcium hydroxide dispersed in water together with a water soluble dye dissolved in the water, to produce a colored calcium carbonate and to allow the resultant colored calcium carbonate to precipitate, and that the resultant colored precipitated calcium carbonate is collected from the aqueous slurry at a pH of 8.2 or more thereof.

The colored precipitated calcium carbonate of the present invention has a strong color fastness, and thus is useful for producing a colored paper sheet having substantially no difference in the color of the front and back surfaces of the colored paper sheet.

The color difference ($\Delta E$) between the front and back surfaces of the colored paper sheet can be determined in accordance with the color difference measurement method of Japanese Industrial Standard (JIS) Z 8730 (1970), and from the equation:

$$\Delta E = [(\Delta L)^2 + (\Delta a)^2 + (\Delta b)^2]^{\frac{1}{2}}$$

wherein $\Delta E$ represents a color difference in the L a b color indication system of two colored objects and $\Delta L$, $\Delta a$ and $\Delta b$ respectively represent a difference in the L-values, a difference in the a-values, and a difference in the b-values of the two colored objects.

The calcium hydroxide usable as a starting material for the method of the present invention can be prepared by slaking a quick lime, which is selected from those usable for the conventional precipitated (light) calcium carbonate used for the paper-making process, with water in a usual manner, and then through usual concentration-adjusting, refining and screening procedures.

The water-soluble dyes usable for the method of the present invention include direct dyes, basic dyes, acid dyes, and water soluble optical brightening dyes. Usually, the direct dyes are preferably used.

The carbon dioxide-containing gases usable for the method of the present invention can be selected from those usable for conventional calcium carbonate-producing processes, and include pure carbon dioxide gas and mixtures of carbon dioxide with at least one other gas, for example, air.

There is no specific restriction of the concentrations of the calcium hydroxide and the water-soluble dye in the aqueous slurry containing the calcium hydroxide and the water-soluble dye.

Usually, the calcium hydroxide is preferably in a concentration of 50 to 200 g/l. The concentration of the water-soluble dye in the aqueous slurry is important in the consideration of the aimed hue and color depth, and the type of dye. For example, where a paper sheet is colored in a hue having a b-value of from 10 to 14, the water-soluble dye is used in an amount of 0.1 to 0.3% based on the dry weight of the calcium hydroxide.

The carbon dioxide-containing gas is introduced into the aqueous slurry containing the calcium hydroxide and the water-soluble dye, preferably at a temperature of 10° C. to 80° C., in the same manner and under the same conditions as those used in the conventional calcium carbonate-producing method.

The introduction of the carbon dioxide-containing gas is continued until the conversion of the entire amount of calcium hydroxide in the aqueous slurry to calcium carbonate is completed. The completion of the conversion reaction can be confirmed by measuring the amount of calcium hydroxide remaining in the aqueous slurry or the pH of the aqueous slurry.

Usually, it is possible to control the conversion reaction by calculating the reaction time necessary for the completion of the conversion reaction, from the content of the calcium hydroxide in the aqueous slurry and the concentration and flow rate of the carbon dioxide-containing gas.

In the aqueous slurry, the resultant colored calcium carbonate is allowed to precipitate.

In the method of the present invention, the resultant colored precipitated calcium carbonate is collected from the aqueous slurry at a pH of 8.2 or more of the aqueous slurry. If this pH is less than 8.2, the color-fastness in water of the resultant colored precipitated calcium carbonate is unsatisfactory.

The collection of the colored precipitated calcium carbonate can be carried out by a conventional separating method, for example, filtration or centrifugalizing.

The collected colored precipitated calcium carbonate is in the form of fine particles, and has a very strong color fastness in water such that when the colored precipitated calcium carbonate particles are dispersed together with a pulp in water and the resultant aqueous pulp slurry containing the colored precipitated calcium carbonate particles is subjected to a paper-forming process, substantially no dye on the colored precipitated calcium carbonate particles is dissolved into the aqueous pulp slurry to be thereby moved to the pulp fibers therein.

The reasons why the colored precipitated calcium carbonate produced by the method of the present invention exhibits a strong color fastness in water are not completely clear, but it is assumed that the water-soluble dye molecules in the aqueous slurry are converted to a water-insoluble dye salt or substantially water-insoluble dye salt by a reaction with calcium hydroxide, and the converted dye salt molecules are firmly fixed to the resultant calcium carbonate molecules. Namely, it is assumed that a complicated dye salt complex is formed from the water-insoluble or substantially water-insoluble dye salt and the calcium carbonate as precipitated from the aqueous slurry.

The colored precipitated calcium carbonate produced by the method of the present invention has a very strong color fastness in water, and therefore, when used for the production of a colored paper sheet containing, as a filler, the precipitated calcium carbonate, by a neutral paper-forming method, the colored precipitated calcium carbonate of the present invention prevents an undesirable generation of a color difference between the front and back surfaces of the colored paper sheet.

The colored paper sheet can be produced from an aqueous slurry containing a colored pulp and a colored precipitated calcium carbonate, or an aqueous slurry containing a non-colored pulp, a water-soluble dye for the pulp and a colored precipitated calcium carbonate, by a usual paper-forming method.

In the method of the present invention, the introduction of the carbon dioxide-containing gas causes a rise of the pH of the aqueous slurry containing calcium hydroxide, and accordingly, preferably the introduction of the carbon dioxide-containing gas is stopped at a pH of 8.2 or more of the aqueous slurry.

In an embodiment of the method of the present invention, the pH of the aqueous slurry is controlled to a level of 8.5 or more at at least a stage at which the conversion of the calcium hydroxide to the colored calcium carbonate is completed.

The inventors of the present invention found, for the first time, that the color fastness in water of the colored calcium carbonate is greatly influenced by the pH of the aqueous slurry, especially at a final stage at which the conversion of the calcium hydroxide in the slurry to the colored calcium hydroxide is completed. That is, in the step of introducing the carbon dioxide-containing gas, the pH of the colored aqueous slurry containing calcium hydroxide and a water-soluble dye is preferably controlled to a level of 8.5 or more, more preferably 8.5 to 10.5, at at least a stage at which the conversion of the calcium hydroxide to the colored calcium carbonate is completed. This control of the pH of the colored aqueous slurry effectively increases the strength of the color fastness in water of the resultant colored calcium carbonate. Therefore, when dispersed in water together with a pulp, to provide an aqueous pulp slurry, the amount of dye dissolved from the colored calcium carbonate particles into the aqueous pulp slurry and absorbed in the pulp is substantially zero or very small.

It is assumed that the pH of 8.5 or more of the aqueous slurry at the final stage at which the conversion of the calcium hydroxide to the colored calcium carbonate is completed is effective for promoting the conversion of the water-soluble dye to a water-insoluble or hard water-dissolving dye salt, and thus for enhancing the color fastness in water of the resultant color calcium carbonate.

Accordingly, preferably in the carbon-dioxide containing gas introduction step, the pH of the colored aqueous slurry is directly measured and adjusted to a level of 8.5 or more, particularly at the final stage thereof at which the conversion of the calcium hydroxide to the colored calcium carbonate is completed.

The control of the pH of the colored aqueous slurry can be effected by adding an aqueous solution of calcium hydroxide or sodium hydroxide.

When the colored calcium carbonate produced by the method as mentioned above is used for the preparation of a neutral paper sheet, the resultant pulp slurry containing the colored calcium carbonate has a lower pH of 7 to 8 than the pH of 8.5 or more, of the colored aqueous slurry of calcium hydroxide. Nevertheless, the color fastness in water of the colored calcium carbonate in the aqueous pulp slurry is not affected by the lower pH of the aqueous pulp slurry.

In another embodiment of the method of the present invention, after the conversion of the calcium hydroxide is completed, the aqueous slurry containing the resultant colored precipitated calcium carbonate is mixed with an additional amount of calcium hydroxide, to adjust the pH of the resultant slurry to a level of 9.5 or more.

It was found, for the first time, by the inventors of the present invention that the color fastness in water of the colored precipitated calcium carbonate is greatly influenced by the pH of the aqueous slurry after the conversion of the calcium hydroxide to the colored precipitated calcium carbonate is completed. Also, it was found that the color fastness in water of the colored precipitated calcium carbonate can be enhanced by adjusting the pH of the aqueous slurry, after the conversion of the calcium hydroxide to the colored calcium carbonate is completed, to a level of 9.5 or more, preferably 9.5 to 12.5, by adding an additional amount of calcium hydroxide to the aqueous slurry. Preferably, the aqueous slurry is allowed to stand at the above-mentioned pH for 10 minutes or more.

This adjustment of the pH of the aqueous slurry to 9.5 or more, after the conversion of the calcium hydroxide is completed, effectively enhances the conversion of the water-soluble dye absorbed in the resultant precipitated calcium carbonate to a water-insoluble or a hard water-dissolving dye salt, and thus increases the strength of the color fastness in water of the resultant colored precipitated calcium carbonate.

The addition of the calcium hydroxide is preferably carried out at a temperature of 10° C. to 80° C.

In the method of the present invention, the resultant aqueous slurry containing the colored precipitated calcium carbonate can be employed as a coloring slurry for the paper-forming process. Optionally, the colored precipitated calcium carbonate is collected by separation from the aqueous slurry, and is dried to provide a colored precipitated calcium carbonate powder, in a usual manner.

EXAMPLES

The present invention will be further explained by way of specific examples, which are representative and do not in any way restrict the scope of the present invention.

EXAMPLE 1

A quick lime in an amount of 1.0 kg was mixed with 8.0 l of water and the resultant aqueous slurry was stirred for 4 hours to slake the quick lime into slaked lime (calcium hydroxide), and the resultant aqueous slurry was diluted with an additional amount of water. A reaction vessel with a capacity of 22 l was charged with 10 l of the resultant aqueous slurry containing calcium hydroxide in a concentration of 130 g/l, and further, the aqueous slurry was supplemented with a yellow direct dye (available under the trademark of Kayafect yellow Y Liquid, from Nihon Kayaku K.K.) in an amount of 2.64 g corresponding to 1500 ppm, based on the weight of the calcium carbonate to be produced.

A carbon dioxide gas was blown into the resultant yellow aqueous slurry in the reaction vessel, through a gas-flowing conduit mounted at the bottom of the reaction vessel and having an inside diameter of 6 mm, while stirring the yellow aqueous slurry to convert the calcium hydroxide to a yellow-colored calcium carbonate and to allow the resultant yellow-colored calcium carbonate to precipitate.

The introduction of the carbon dioxide gas was stopped at a pH of the aqueous slurry of 8.5.

The resultant yellow-colored precipitated calcium carbonate was collected by filtration through a filter paper for chemical analysis, washed with water, dried at a temperature of 105° C. in a constant temperature dryer.

The color fastness in water of the resultant colored precipitated calcium carbonate powder was tested in the following manner.

The hue of the resultant yellow-colored precipitated calcium carbonate powder was measured by using a color difference meter (available from Nihon Denshoku Kogyo K.K.). The resultant b-value was 10.0.

A bleached hard wood kraft pulp (referred to as LBKP hereinafter) was washed with water on a sieve having a mesh of 100, to eliminate fine pulp fibers and provide a LBKP fraction which remained on the 100 mesh sieve.

A portion of the resultant LBKP fraction was dispersed in water to provide 5 liters of an aqueous pulp slurry having a consistency of 1% by weight of the pulp.

A portion of this aqueous pulp slurry was subjected to a hand-made paper-forming procedure, and the resultant hand-made paper sheet was dried at a temperature of 105° C. on a rotary dryer. The dried paper sheet had a basis weight of 100 g/m² and a b-value of about 6.6.

A remaining portion of the aqueous pulp slurry was mixed with the yellow-colored precipitated calcium carbonate powder in an amount of 100% based on the dry weight of the pulp in the slurry to bring the yellow-colored powder into contact with the pulp, and the resultant mixture was stirred at room temperature for 30 minutes, then filtered through a sieve with a mesh of 325. The resultant pulp fraction remaining on the sieve was thoroughly washed with water, to completely separate the yellow-colored precipitated calcium carbonate particles from the pulp, and the separated yellow-colored precipitated calcium carbonate particles were recovered by a filtration.

The b-value of the recovered yellow-colored precipitated calcium carbonate powder was measured.

Also, the resultant pulp slurry separated from the yellow-colored precipitated calcium carbonate particles was converted to a hand-made paper sheet in the same manner as mentioned above, and the b-value of the resultant paper sheet was measured.

The same mixing, separating and paper-forming procedures as mentioned above were repeated twice more (three times in total), when the amount of the aqueous pulp slurry containing the colored calcium carbonate particles was 3 l.

In each of the second and third contact tests, the b-value of the separated colored calcium carbonate powder and the b-value of the paper sheet produced from the recovered pulp were measured.

In the test results, it was confirmed that, in Example 1, even where the contact test of the colored precipitated calcium carbonate particles produced by the method of the present invention with the pulp in water is repeated, the amount of dye removed from the colored calcium carbonate particles and the amount of the dye absorbed by the pulp fibers are small. Namely, the colored precipitated calcium carbonate produced in accordance with the method of the present invention has a strong color fastness in water.

COMPARATIVE EXAMPLE 1

The same procedures as in Example 1 were carried out, with the following exceptions.

The precipitated calcium carbonate powder was prepared without adding the yellow dye to the aqueous slurry of calcium hydroxide.

The resultant colorless precipitated calcium carbonate powder was dispersed in water to prepare an aqueous slurry containing 300 g/l of the colorless calcium carbonate. The aqueous slurry of the colorless precipitated calcium carbonate was supplemented with the same yellow dye as in Example 1, in an amount of 1500 ppm based on the dry weight of the colorless precipitated calcium carbonate, and the resultant mixture was stirred at room temperature for 30 minutes to color the calcium carbonate particles with the yellow dye. The resultant yellow-colored precipitated calcium carbonate powder had a b-value of 12; the same as in Example 1.

The same mixing, separating, and paper-forming procedures as in Example 1 were repeated three times.

It was found that in Comparative Example 1, the yellow-colored precipitated calcium carbonate powder prepared by coloring a colorless precipitated calcium carbide powder with a dye exhibited a poor color fastness in water. That is, by bringing the colored precipitated calcium carbonate particles into contact with pulp fibers in water, the dye absorbed in the precipitated calcium carbonate particles was desorbed and moved to the pulp fibers. Therefore, with an increase in the number of contact tests, the color depth of the colored precipitated calcium carbonate powder was reduced.

EXAMPLE 2

The same procedures as in Example 1 were carried out, with the following exceptions.

An aqueous pulp slurry containing the same yellow dye as in Example 1 in an amount of 550 ppm based on the dry weight of the pulp in the slurry and usable for producing a paper sheet having a b-value of 12.0 was prepared.

This yellow-colored aqueous pulp slurry was mixed with the yellow-colored precipitated calcium carbonate powder in amount of 25 parts by weight per 100 parts by dry weight of the pulp.

The resultant yellow colored aqueous pulp slurry containing the yellow-colored precipitated calcium carbonate was subjected to a paper-forming process by using a single wire paper machine, to produce a yellow-colored paper sheet.

The color difference ($\Delta E$) between the front and back surfaces of the resultant yellow-colored paper sheet was measured in the same manner as in Example 1 and indicated in Table 1.

In the resultant yellow-colored paper sheet, the yield of the yellow-colored precipitated calcium carbonate was 80% by weight.

COMPARATIVE EXAMPLE 2

The same procedures as in Comparative Example 1 were carried out, with the following exceptions.

The colored paper sheet was prepared from the colored aqueous pulp slurry containing the same colored precipitated calcium carbonate as in Comparative Example 1, in the same manner as in Example 2.

The color difference ($\Delta E$) between the front and back surfaces of the resultant yellow-colored paper sheet is shown in Table 1.

COMPARATIVE EXAMPLE 3

The same procedures as in Comparative Example 2 were carried out except that a non-colored precipitated calcium carbonate powder was added to the colored aqueous pulp slurry.

The color difference ($\Delta E$) between the front and back surfaces of the resultant colored paper sheet is indicated in Table 1.

TABLE 1

| Example No. | Item $\Delta E$ |
| --- | --- |
| Example 2 | 0.2 |
| Comparative Example 2 | 1.2 |
| Comparative Example 3 | 1.3 |

Table 1 clearly shows that the color difference ($\Delta E$) between the front and back surfaces of the colored paper sheet of Example 2 is significantly small in comparison with that of Comparative Examples 2 and 3.

EXAMPLE 3

The same procedures as in Example 2 were carried out, with the following exceptions.

In the preparation of the colored aqueous pulp slurry, the dye for coloring the calcium carbonate powder was used in an amount of 2000 ppm based on the weight of the calcium carbonate to be produced, and the dye for coloring the pulp was employed in an amount of 800 ppm based on the dry weight of the pulp.

The resultant colored paper sheet had a b-value of 14.0.

The resultant colored paper sheet had a color difference ($\Delta E$) of 0.2 between the front and back surfaces thereof.

EXAMPLE 4

The same procedures as in Example 1 were carried out, with the following exceptions.

In a final stage of the carbon dioxide gas-introducing step, the pH of the aqueous slurry was adjusted to a level of 8.5 by adding an aqueous solution of calcium hydroxide, to allow the resultant precipitated calcium carbonate to precipitate at this pH.

The b-value of the resultant colored precipitated calcium carbonate powder was 10.8.

The b-value of the resultant colored paper sheet produced from the colored aqueous pulp slurry containing the colored precipitated calcium carbonate was 6.6.

Also, when the colored precipitated calcium carbonate particles were recovered and collected from the colored pulp slurry in the same manner as in Example 1, the collected colored calcium carbonate powder had a b-value of 9.6 as shown in Table 2.

Also, when the colored pulp slurry separated from the colored calcium carbonate particles was converted to a colored paper sheet in the same manner as in Example 1, the b-value of the resultant colored paper sheet was 10.1 as shown in Table 2.

Table 2 also shows the L-values, a-values, and whole light whitenesses of the collected colored calcium carbonate powder and the colored paper sheet produced from the separated colored pulp slurry.

Table 2 clearly shows that, when the colored precipitated calcium carbonate particles were brought into contact with the pulp fibers in the pulp slurry, the amount of the yellow dye transferred from the colored precipitated calcium carbonate particles to the pulp fibers was very small.

EXAMPLES 5 TO 9

In each of Examples 5 to 9, the same procedures as used in Example 4 were carried out except that, at the final stage of the carbon dioxide gas-introducing step, the pH of the aqueous slurry was adjusted to the level (9.5, 10.0, 10.5, 11.8, or 12.1) as indicated in Table 2.

The results are shown in Table 2.

Table 2 also shows that the amount of dye transferred from the colored precipitated calcium carbonate particles to the pulp fibers was very small.

COMPARATIVE EXAMPLE 4

The same procedures as in Example 4 were carried out, except that the introduction of the carbon dioxide-containing gas was stopped at a pH of the aqueous slurry of 7.7.

The test results are shown in Table 2.

In Table 2, the paper sheet produced from the aqueous pulp slurry separated and recovered from the colored precipitated calcium carbonate-mixed aqueous pulp slurry exhibited a high b-value of 14.6, and the colored calcium carbonate powder recovered from the colored precipitated calcium carbonate-mixed aqueous pulp slurry had a low b-value of 8.4 These data indicate that the color fastness in water of the colored precipitated calcium carbonate powder was not satisfactory.

COMPARATIVE EXAMPLE 5

The same procedures as in Example 4 were carried out, except that the introduction of the carbon dioxide gas was stopped at a pH of the aqueous slurry of 8.1.

The test results are shown in Table 2.

In Table 2, the paper sheet produced from the aqueous pulp slurry separated and recovered from the colored precipitated calcium carbonate-mixed aqueous pulp slurry exhibited a high b-value of 13.7, and the colored calcium carbonate powder separated and collected from the colored precipitated calcium carbonate-mixed aqueous pulp slurry had a low pH of 8.9. These data indicate that the color fastness of the colored precipitated calcium carbonate powder was not satisfactory.

TABLE 2

| Example No. | Colored calcium carbonate powder (*)₂ | | | | | Paper sheet (*)₃ | | | |
|---|---|---|---|---|---|---|---|---|---|
| | pH (*)₁ | L (%) | a | b | Whole light whiteness (%) | L (%) | a | b | Whole light whiteness (%) |
| Comparative Example | | | | | | | | | |
| 4 | 7.7 | 98.7 | −1.7 | 8.4 | 85.7 | 93.8 | −1.7 | 14.6 | 68.4 |
| 5 | 8.1 | 98.9 | −1.8 | 8.9 | 85.4 | 93.9 | −1.7 | 13.7 | 69.8 |
| Example | | | | | | | | | |
| 4 | 8.5 | 98.8 | −2.1 | 9.6 | 84.2 | 94.0 | −1.0 | 10.1 | 74.8 |
| 5 | 9.5 | 98.4 | −1.7 | 9.9 | 82.8 | 93.9 | −0.8 | 9.9 | 76.3 |
| 6 | 10.0 | 98.3 | −1.7 | 10.1 | 82.6 | 93.6 | −0.8 | 9.8 | 75.9 |
| 7 | 10.5 | 98.3 | −1.7 | 10.1 | 82.6 | 93.8 | −0.8 | 9.8 | 76.1 |
| 8 | 11.8 | 98.3 | −1.7 | 10.2 | 82.4 | 93.9 | −0.8 | 9.6 | 75.3 |
| 9 | 12.1 | 98.4 | −1.4 | 10.4 | 82.5 | 94.0 | −0.8 | 9.3 | 76.0 |

Note:
(*)₁ ... The introduction of carbon dioxide gas was stopped at this pH of the aqueous slurry, and the resultant colored precipitated calcium carbonate was collected.
(*)₂ ... A colored calcium carbonate powder separated and recovered from a colored precipitated calcium carbonate-mixed aqueous pulp slurry.
(*)₃ ... A paper sheet produced from an aqueous pulp slurry separated and recovered from a colored precipitated calcium carbonate-mixed aqueous pulp slurry.

EXAMPLE 10

The same procedures as in Example 1 were carried out, with the following exceptions.

The carbon dioxide gas was replaced by a gas containing 20% by weight of carbon dioxide and the balance consisting of air.

The introduction of the carbon dioxide-containing gas was stopped when the pH of the aqueous slurry reached 7.0.

The resultant aqueous slurry containing the colored precipitated calcium carbonate was supplemented with calcium hydroxide to adjust the pH of the aqueous slurry to 9.5. Then, the aqueous slurry was filtered through a chemical analysis filter paper (No. 2, made by Toyo Roshi K.K.) and the filtered colored precipitated calcium carbonate was washed with water, dried at a temperature of 105° C. in a constant temperature dryer, and finely pulverized in an agate mortar.

The resultant colored precipitated calcium carbonate powder had a b-value of 10.6, determined in the same manner as in Example 1.

The hand-made non-colored paper sheet prepared from a LBKP in the same manner as in Example had a b-value of 6.2.

A colored aqueous pulp slurry was prepared by mixing 50 g of the colored precipitated calcium carbonate powder and 50 g of the aqueous slurry of the LBKP fraction which did not pass through the 100 mesh sieve with 5 l of water, and stirred at room temperature for 30 minutes to bring the colored precipitated calcium carbonate particles into contact with the pulp fibers in water. Then, from this colored aqueous slurry, the colored calcium carbonate powder and the pulp were separated and recovered, respectively, in the same manner as in Example.

The recovered colored calcium carbonate powder had a b-value of 9.7.

The recovered pulp was converted to a hand-made paper sheet in the same manner as in Example 1. This paper sheet had a b-value of 9.9.

EXAMPLES 11 AND 12

In each of Examples 11 and 12, the same procedures as in Example 1 were carried out except that, after the introduction of the carbon dioxide-containing gas was stopped at a pH of the aqueous slurry of 7.0, the pH of the aqueous slurry was adjusted to 10.5 (Example 11) or 11.5 (Example 12) by adding calcium hydroxide.

The test results are shown in Table 3.

COMPARATIVE EXAMPLES 6 AND 7

In each of Comparative Examples 6 and 7, the same procedures as in Example 10 were carried out, with the following exceptions.

The introduction of the carbon dioxide-containing gas was stopped when the pH of the aqueous slurry reached 7.0 (Comparative Example 6) or 7.5 (Comparative Example 7).

No addition of the calcium hydroxide after the introduction of the carbon dioxide-containing gas was completed, was made.

The test results are shown in Table 3.

TABLE 3

| | | Item | |
|---|---|---|---|
| | | Color fastness of colored calcium carbonate | |
| Example No. | pH (*)₄ | b-value of recovered colored precipitated calcium carbonate (*)₅ | b-value of recovered pulp paper sheet (*)₆ |
| Example | | | |
| 10 | 9.5 | 9.7 | 9.9 |
| 11 | 10.5 | 10.0 | 9.6 |
| 12 | 11.0 | 10.2 | 9.4 |
| Comparative Example | | | |
| 6 | 7.0 | 8.2 | 14.1 |
| 7 | 7.5 | 8.6 | 13.1 |

Note
(*)₄ ... The resultant colored precipitated calcium carbonate was collected from aqueous slurry at this pH.
(*)₅ ... This colored precipitated calcium carbonate was recovered from a colored precipitated calcium carbonate-mixed aqueous pulp slurry.
(*)₆ ... This paper sheet was produced from a recovered pulp collected from the colored precipitated calcium carbonate-mixed aqueous pulp slurry.

We claim:
1. A method of producing a colored precipitated calcium carbonate, comprising:

mixing calcium hydroxide with a watersoluble colored dye in water to prepare a colored aqueous slurry thereof;

introducing a gas containing carbon dioxide into the colored aqueous slurry to convert the calcium hydroxide to a colored calcium carbonate and causing the resultant colored calcium carbonate to precipitate; and collecting the colored precipitated calcium carbonate from the aqueous slurry at a pH of the aqueous slurry of 8.2 or more.

2. The method as claimed in claim 1, wherein the calcium hydroxide in the aqueous slurry is in a concentration of 50 to 200 g/l.

3. The method as claimed in claim 1, wherein the water-soluble dye in the aqueous slurry is in an amount of 0.1 to 0.3% based on the dry weight of calcium hydroxide.

4. The method as claimed in claim 1, wherein the water-soluble dye is selected from the group consisting of direct dyes, basic dyes, acid dyes and water-soluble optical brightening dyes.

5. The method as claimed in claim 1, wherein the introduction of the carbon-dioxide-containing gas is carried out at a temperature of from 10° C. to 80° C.

6. The method as claimed in claim 1, wherein the pH of the aqueous slurry is controlled to a level of 8.5 or more at at least a stage at which the conversion of the calcium hydroxide to the colored calcium carbonate is completed.

7. The method as claimed in claim 1 wherein, after the conversion of the calcium hydroxide is completed, the aqueous slurry containing the resultant colored precipitated calcium carbonate is supplemented with an additional amount of calcium hydroxide to adjust the pH of the resultant aqueous slurry to a level of 9.5 or more.

* * * * *